June 27, 1961

S. C. HETH ET AL 2,989,829

WINDROWER WITH CRUSHING ROLLS

Filed Dec. 24, 1958

Inventors:
Sherman C. Heth
David R. Snoeyenbos
Paul O. Pippel
Atty.

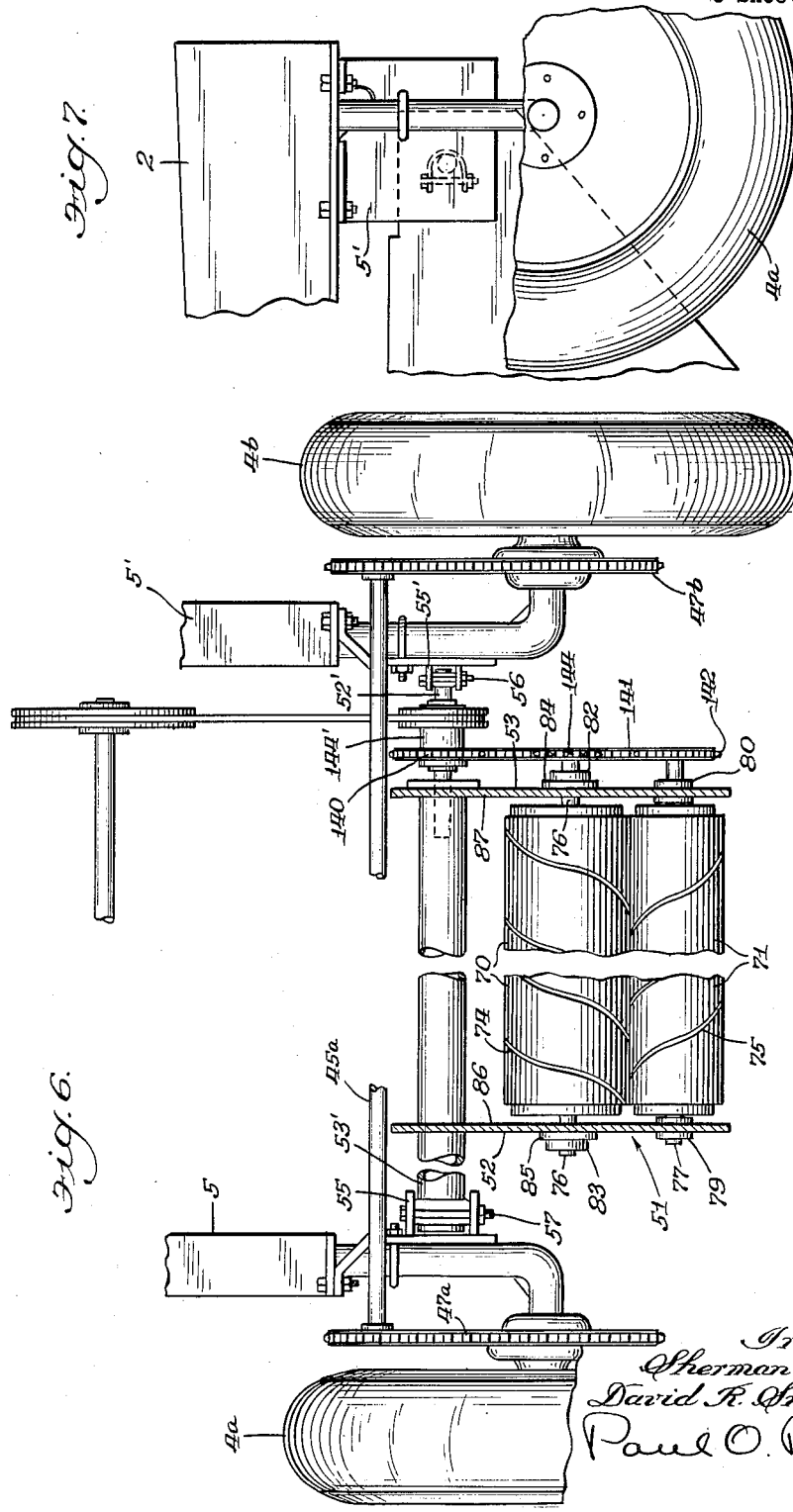

United States Patent Office 2,989,829
Patented June 27, 1961

2,989,829
WINDROWER WITH CRUSHING ROLLS
Sherman C. Heth, Chicago, and David R. Snoeyenbos, Berwyn, Ill., assignors to International Harvester Company, Chicago, Ill., a corporation of New Jersey
Filed Dec. 24, 1958, Ser. No. 782,809
12 Claims. (Cl. 56—1)

This invention relates to hay processing machines, more specifically to a novel windrower and hay crushing roll combination.

A general object of the invention is to provide a novel combination windrower and hay crusher wherein the transition of the material from the windrower to the crusher is accomplished by depositing the material in the windrow upon the ground and wherein the crusher is disposed rearwardly of the discharge of the windrower and picks the material as it is falling onto the ground.

A more specific object of the invention is to provide a novel crusher attachment for a windrower so that it may be sold as optional equipment and which is readily adaptable for mounting in current production machines.

A further object of the invention is to provide a novel linkage for mounting and conditioning the crushing mechanism into operative and transport positions consistent with corresponding positioning of the harvesting platform of the windrower.

A more specific object of the invention is to provide a novel crusher unit which is interconnected to the supporting harvesting machine, the attachment including linkage for releasing the engagement of the opposed crushing rolls upon elevation of the crushing unit to transport position.

These and other objects will become more apparent from the specifications and the drawings wherein:

FIGURE 6 is an enlarged transverse vertical sectional view taken substantially on line 6—6 of FIGURE 2; and FIGURE 7 is a fragmentary side elevational view of the right side of the combination illustrating a portion of the crusher mounting.

Figure 1:
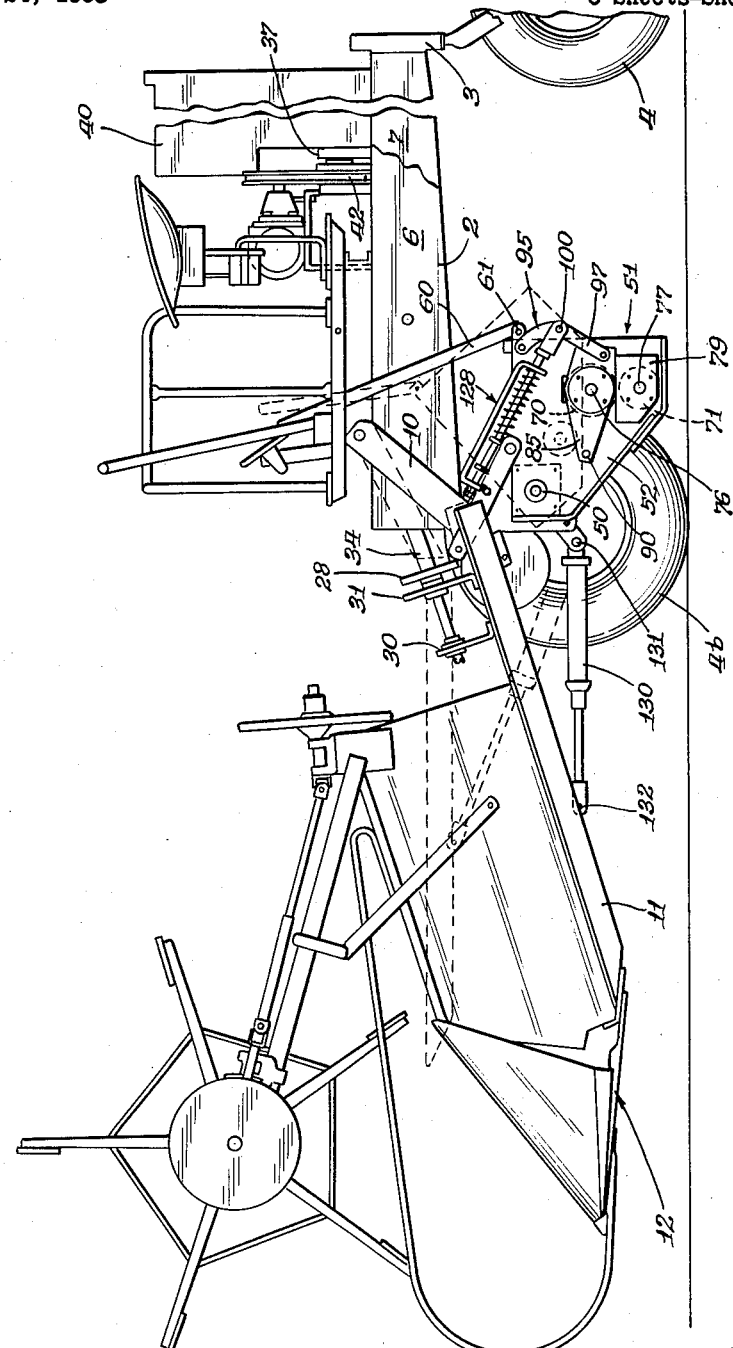
FIGURE 1 is a broken away fragmentary side elevational view of a windrower illustrating the crushing unit mounted thereon.
Figure 2:
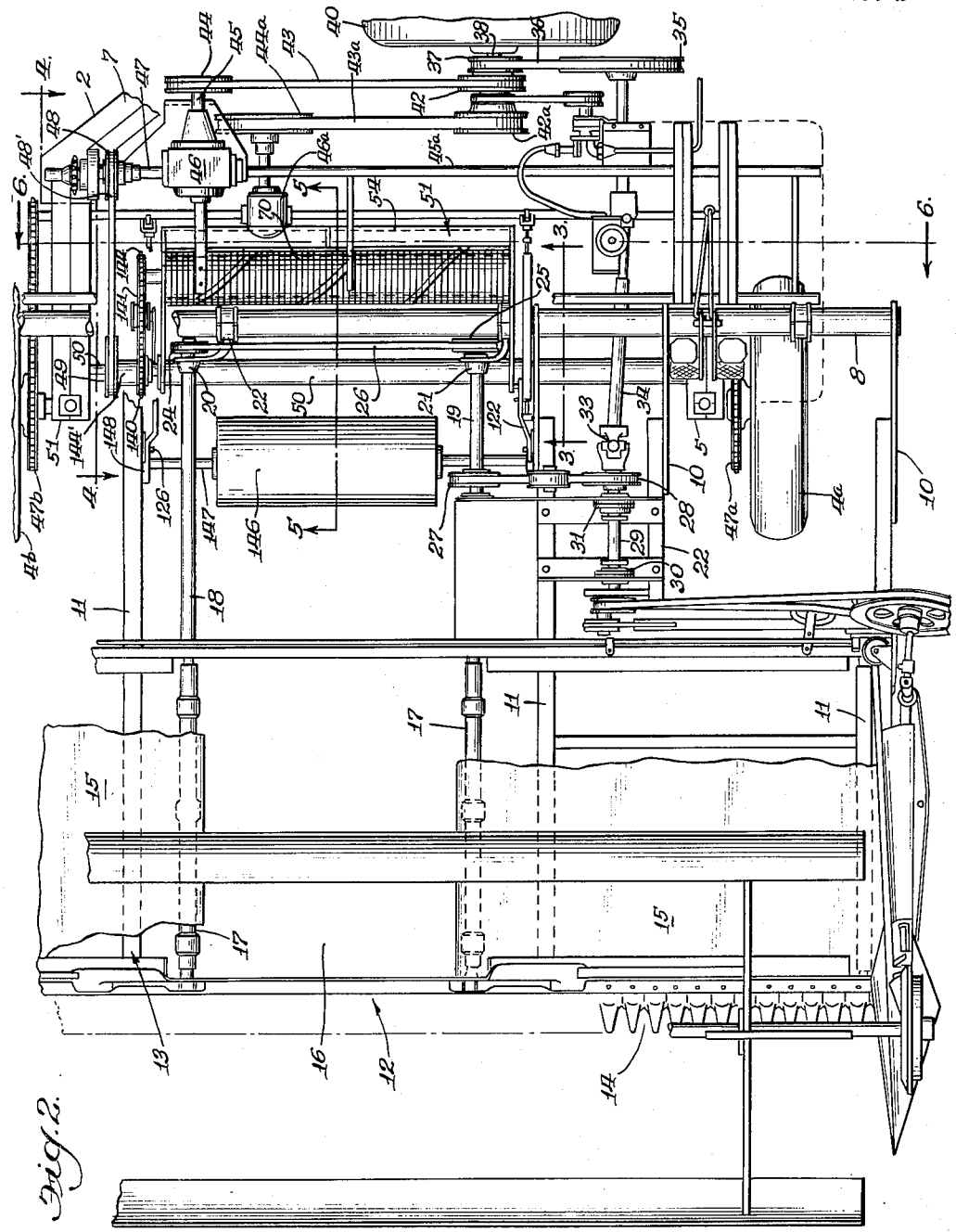
FIGURE 2 is a fragmentary plan view of the novel structure shown in FIGURE 1.

Describing the invention in detail and having particular reference to the drawings there is shown a self-propelled windrower including an ambulatory support comprising a main frame structure 2, the rear end of which is provided with a sleeve 3 for mounting the tail wheel 4 on a vertical axis and the front being supported by wheels 4a, 4b.

The frame structure includes depending pedestals 5, 5' at the sides of the triangular platform framework which includes rearwardly converging frame members 6 and 7 and a tubular forward transverse frame member 8.

The front member 8 mounts forwardly extending arms 10 for swinging movement about a transverse generally horizontal axis, each arm 10 being rigidly connected to the adjacent fore and aft extending members 11 of the harvester platform generally indicated 12.

The platform 12 is of conventional construction having a generally rectangular framework 13 with a mower bar 14 along its leading edge and carrying a draper type conveyor 15 at each side of the central discharge opening 16. It will be seen that the conveyors 15 are driven by rollers 17 which are located along the lateral margins of the central opening 16. The right roller shaft 17 is driven by a shaft 18 which extends through the rear of the platform and the left shaft 17 being driven by a rearwardly coaxially extending shaft 19, the said shafts 18 and 19 being provided at their rear ends with supports 20 and 21 which are carried by the frame structure 22 which mounts the platform with the arms 11 from the supporting beam 8 whereby the drives for the platform move with it. The shafts 18 and 19 are provided at their rear ends with pulleys 24 and 25 which are drivingly interconnected by means of a belt 26.

The shaft 19 is provided with a pulley 27 which is driven from the main drive shaft pulley 28 which is mounted on a shaft extension 29 which is also mounted by bearings and supports 30 and 31 from the framework 22 which constitutes part of the support structure for the platform 12. The shaft 29 is connected by means of a universal joint 33 to the shaft 34 which is suitably supported from the frame structure of the supporting and motivating unit, the shaft 34 being driven by a pulley 35 mounted thereon, pulley 35 being driven by belt 36 which in turn is driven by pulley 37 which is driven from the output shaft 38 of the internal combustion engine or power source 40 mounted on the main frame structure.

The engine output shaft 38 extends in a fore and aft direction and is also provided with a pulley 42 which drives a belt 43 which drives a pulley 44 connected to the input shaft 45 of the gear train contained in the gear box 46 which has an output shaft 47 with pulley 48 which drives belt 48' which drives pulley 49 which is rotatably supported on the mounting shaft or beam assembly 50 of the crusher unit generally designated 51.

Shaft 38 also drives pulley 42a which drives a belt 43a which drives pulley 44a driving the shaft 45a through gear box 46a, shaft 45a being mounted on the framework and driving the chain and sprocket assemblies 47a, 47b which drive wheels 4a, 4b.

Figure 5:
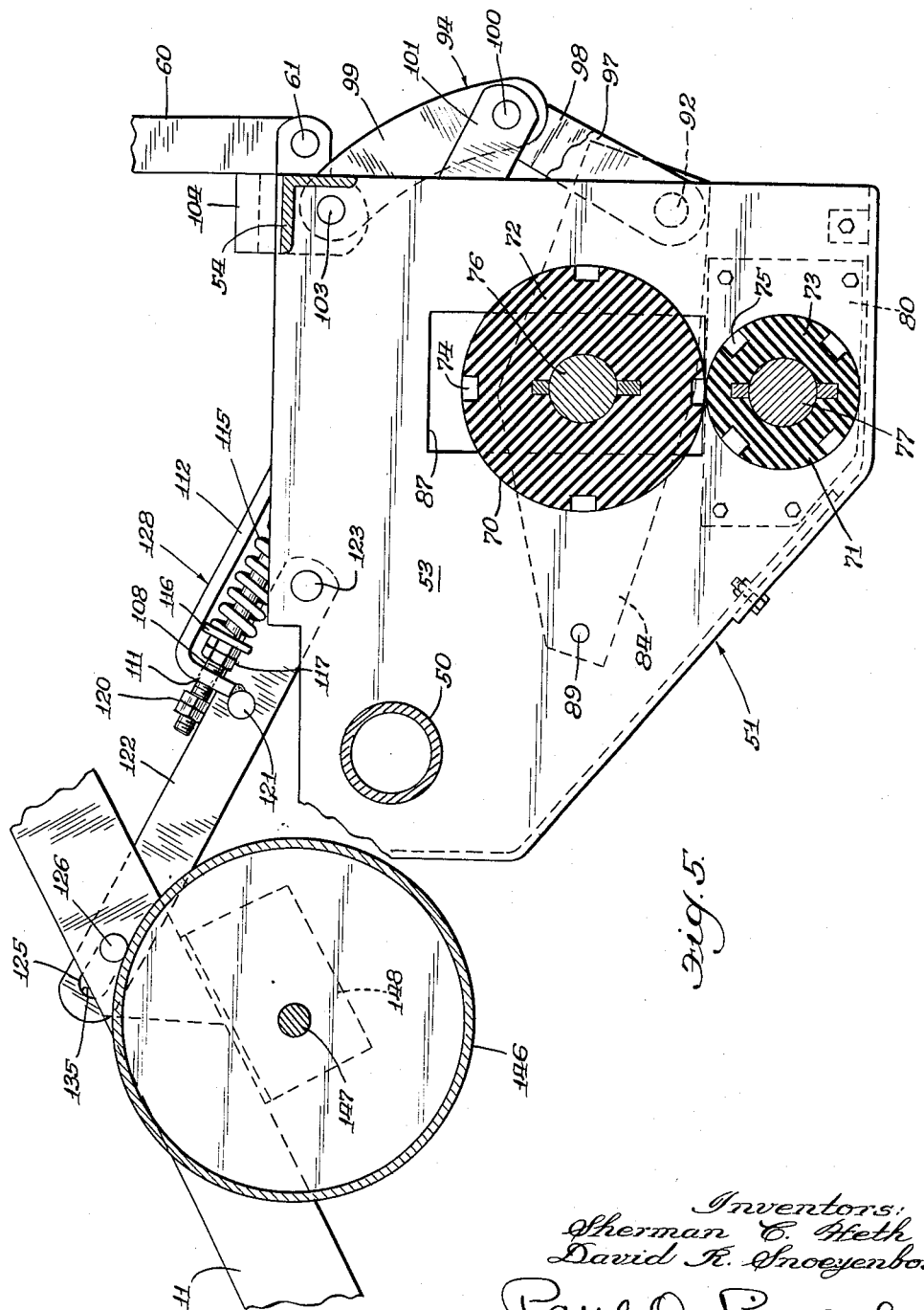
FIGURE 5 is a cross-sectional view taken substantially on the line 5—5 of FIGURE 2 on an enlarged scale.

The crusher unit is disposed immediately rearwardly of the discharge opening 16 of the windrower and comprises a pair of fore and aft extending side plates 52, 53 which along their upper rear corners are interconnected by an angle beam 54 (FIG. 5). The upper front corners of the plates are interconnected by the transverse beam assembly 50 which at its ends 52' and 53' projects into a U-shaped bracket 55' and 55 which are fastened on the interior sides of the pedestals 5 and 5'. It will be seen that the brackets open rearwardly and the access slot is closed in bracket 55' by the bolt assembly 56 and the bracket 55 by the bolt assembly 57 so that withdrawal of these bolts 56 and 57 permits for assembly and disassembly of the crushing unit with respect to the basic structure.

Figure 3:
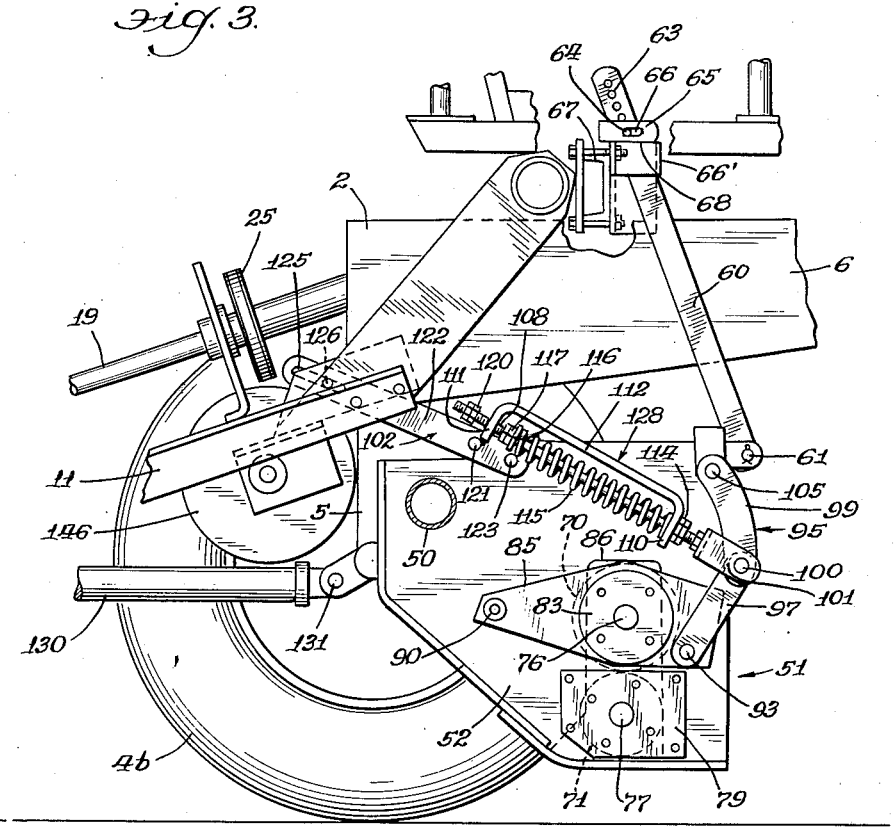
FIGURE 3 is an enlarged sectional view taken substantially on the line 3—3 of FIGURE 2 illustrating the parts in operative position.

It will be seen that shaft assembly 50 thus provides a mounting as well as pivot for the crushing unit about a substantially horizontal transverse axis. The lowered position of the crushing unit is controlled by means of a limiting link 60 which is pivoted at its lower end as at 61 to the beam member 54 (FIG. 5) intermediate its ends. The link or strap 60 extends upwardly and at its upper end is provided with a series of holes 63 (FIG. 3) which admit a pin 64 on which is mounted a stop 65, the stop being in the form of a U-shaped member with slots 66 at opposite sides thereof admitting the pin 65 therethrough. The link 60 extends through a sleeve 66' which is fastened to the cross member 67 of the main frame which interconnects the forward extremities of the side members 6 and 7 of the main frame structure. Thus it will be seen as well shown in FIGURE 4 that upon lowering of the crusher unit about the axis 50 the unit rotating thereabout in a counterclockwise direction and lowering its rear end downwardly, the lower limit is determined by the position of the stop 65 and its abutment with the upper edge 68 of the sleeve 66'.

The crushing unit comprises a pair of superposed upper and lower crushing rolls 70 and 71, each having a body of elastomer material such as tire carcass fiber impregnated rubber, the body 72 of the upper roll 70 being of larger diameter than the body 73 of the lower roll and each being provided with suitable spiral grooving 74 and 75 to increase the aggressiveness thereof. The body 72 is keyed and mounted on a shaft 76 and the body of the lower roll is keyed and mounted on the shaft 77. The shaft of the lower roll is journalled at opposite ends in bearing structures 79 and 80 which are suitably fastened to the side plates 52 and 53. The shaft of the upper roll is carried in bearing assemblies 82 and 83 (FIG. 6) which are mounted on arms 84 and 85 intermediate their ends, the ends of the shaft 76 extending through slots 86 and 87 in the side plates 52 and 53. Thus it will be seen that the arms 84 and 85 are disposed outwardly of the plates 53 and 52 respectively and that the arm 84 is pivoted at its forward end on a substantially horizontal transverse axis by means of a pin assembly 89 to the related side wall 53 and that the forward end of the arm 85 is pivoted in a substantially horizontal axis by means of a pin 90 to the related side wall 52. The rear ends of the levers 84 and 85 are pivoted on substantially horizontal axes as at 92 and 93 to the toggle linkages 94 and 95.

Inasmuch as the linkages 94 and 95 are identical the same numerals will be applied to the corresponding parts.

Each toggle linkage 94 and 95 comprises a lower link means in the form of a pair of link members 97 and 98 which at their lower ends are pivoted respectively for the linkage 94 at the point 92 and for linkage 95 at point 93. The links 97 and 98 extend diagonally upwardly and rearwardly of their points in connection to the respective arms and at their upper ends flank and embrace the lower end of an upper link 99 and are pivoted by means of a pin 100 to a jaw 101 of an actuating mechanism 102.

The upper end of the link 99 of the toggle assembly 94 is pivoted as at 103 (FIG. 4) to the bracket 104 connected to the frame structure of the crusher and the upper link 99 of the toggle linkage 95 is pivoted as at 105 (FIG. 3) to the structure 106 which is suitably connected to the adjacent frame structure of the crusher unit.

The jaw 101 is connected to the inner end of a rod 108, the rod 108 projecting through downwardly extending legs 110 and 111 of a C-shaped reaction member, the bight 112 of which overlies the associated rod 108. The leg 110 is interposed between the nut 114 threaded on the lower end of the rod 108 and the lower end of a compression spring 115, the spring 115 being sleeved over the rod and abutting at its upper end as at 116 against an abutment stop 117 on the rod. It will be seen that by advancing or retreating the nut 114 the compression in the spring 115 can be varied and that in effect the C-shaped strap and the rod constitute a yieldable tension member or assembly 128. The rod 108 projects at its upper end through a suitable guide opening in the leg 111 and that its upper end is provided with a stop nut assembly 120 threaded thereon for abutment with the outer side of the leg 111 to limit the extension of the assembly.

The lower end of the leg 111 is weld-connected to a pivot 121 in the form of a pin which extends through the lifting strap 122 at a point intermediate its ends, the lifting strap having its lower end pivoted by means of a pin 123 to the upper forward portion of the adjacent plate 52 or 53.

It will be seen that the strap 122 and the tension assembly are substantially in alignment and that the upper end of the strap 122 is provided with a slot 125 which provides for a lost-motion connection with the adjacent arm 11 by means of a pin 126 which is slidably received within the slot 125, the pin 126 being fastened to the associated arm 11. It will be seen from a consideration of FIGURES 3 and 4 that the position of the pin 126 as well as the pivot points 123 and 100 is substantially in alignment and therefore a considerable swing of the crusher unit is necessary in order to affect the toggle. Furthermore, it will be observed that the toggle is effectively operative between the point 123 and 100.

Figure 4:
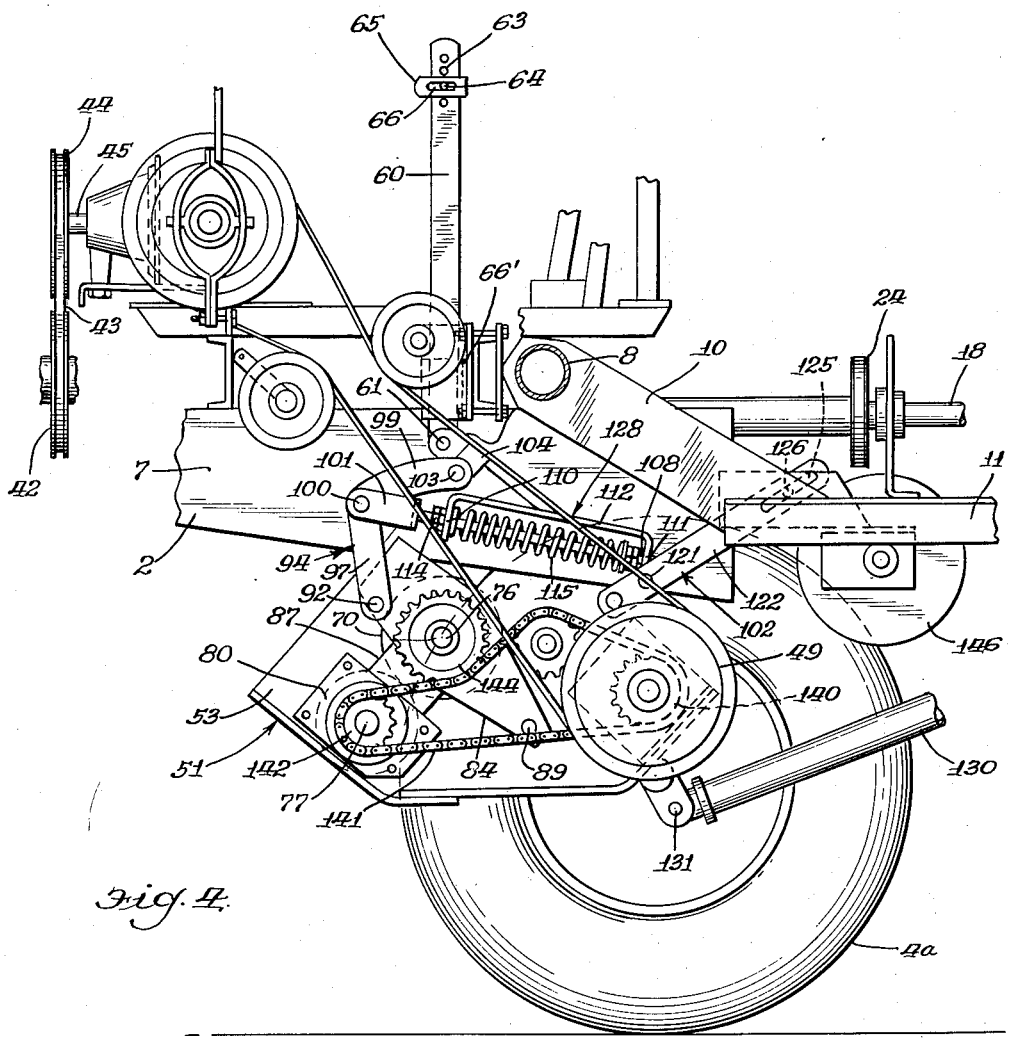
FIGURE 4 is a sectional view taken substantially on the line 4—4 of FIGURE 2 illustrating the parts in transport position.

In order to release the toggle and to separate the rolls as shown in FIGURE 4 the hydraulic cylinders 30 mounted at 131 and 132 between the main frame and the underframe of the platform are actuated to lift the platform. In lifting the platform this causes the pins 126 to ride to the upper ends 135 of the slots 125 and then thereafter to lift the straps with incidental rotation of the crusher unit about the shaft 50.

The movement of the straps causes a jackknifing action of the straps about the points 123 which in turn moves the assemblies 128 in compression against the stops 114 and through the rod 108 to the points 100 which in turn break the togle and jackknife the upper and lower link assemblies 97, 98 and 99 so that there is an upward rotation of the lever arm 84 and 85 with attendant separation of the crushing rolls.

The drive for the crushing rolls taken off the pulley 49 by means of a sprocket 140 which is attached thereto and rotatable about the shaft 50, the sprocket 140 driving a suitable chain arrangement 141 which is wrapped around the sprocket 142 which is carried on the shaft 77 of the lower roll 71 and being back-wrapped about the sprocket 144 which is mounted on the shaft 76 of the upper roll.

It will be seen that the arrangement is such that the entire assembly rotates about the shaft 50 and therefore the drive is in no way disturbed as the platform is adjusted. An overrunning clutch 144' is located in the connection between the pulley 49 and sprocket 140 so that the rollers may rotate to clear themselves even though the engine is stopped.

A compacting or compressing means 145 is provided behind the windrower discharge opening and ahead of crusher and is in the form of a cylindrical roller 146 which is rotatably mounted via its shaft 147 from brackets 148 on the arms 11. The roller 146 being carried by arms 11 its position changes in that when the platform is positioned high it moves up and does not interfere with normal volume flow of crops, but in the lowered position where normally a high volume of crops is processed because cut lower the roller being lower effects greater compression.

The foregoing description is of a preferred embodiment and it will be understood that variations will become readily apparent to those skilled in the art within the scope of the appended claims.

What is claimed is:

1. For a windrower of the type having an ambulatory wheel supported frame, a windrowing structure including forwardly projecting arms pivoted on said frame, a harvester platform mounted on the arms, means operatively connected between said structure and the frame for raising and lowering the platform, and said platform having a windrow discharge area; a crusher unit independent of the structure swingably mounted upon the frame on a transverse generally horizontal axis in receiving relation to said area, and means operatively interconnecting said crusher unit with said structure, said means operative to swingably lift and lower said crusher in accordance with corresponding movements of the platform.

2. A crusher attachment for a windrower of the type having an ambulatory frame and a harvesting platform structure ahead of the frame and pivotally mounted thereon for vertical swinging movement about a generally horizontal transverse axis, said structure having a windrow area, a crusher unit disposed in fore and aft alignment behind said area and comprising a framework swingably mounted thereabove from said frame on a generally horizontal transverse axis, means including a lost-motion connection between the platform structure and said framework, and means operatively interconnected between the platform structure and the frame for lifting and lowering the structure within the limits of the lost motion connection and beyond said limits for lifting and lowering the crusher unit conjunctively with said structure through said means including said connection.

3. A crusher attachment for a windrower of the type having an ambulatory frame and a harvesting platform structure ahead of the frame and pivotally mounted thereon for vertical swinging movement about a generally horizontal transverse axis, said structure having a windrow discharge area, a crusher unit disposed in fore and aft alignment behind said area and comprising a framework swingably mounted thereabove from said frame on a generally horizontal transverse axis, means including a lost-motion connection between the platform structure and said framework, and means operatively interconnected between the platform structure and the frame for lifting and lowering the structure within the limits of the lost motion connection and beyond said limits for lifting and lowering the crusher unit conjunctively with said structure through said means including said connection, and said means including said connection comprising a member pivoted at one end to said framework on a generally horizontal transverse axis behind the axis of pivot of the framework from said frame, said member extending above said last-mentioned axis and having a second end with a transverse slot, and a pin mounted upon the structure and extending through the slot and abuttable with said member at the end of the slot remote from the crusher unit to lift the latter.

4. A crusher attachment for a windrower of the type having a mobile frame and a harvesting platform structure ahead of the frame and pivotal thereon about a generally horizontal transverse axis, means for lifting and lowering the harvester platform structure operatively connected thereto, said platform structure having a windrower discharge area, a crusher unit having a framework including mounting means, means on the mobile frame removably connected to said mounting means and providing therewith a transverse generally horizontal axis of pivot for the crusher about which it is raised and lowered, said crusher including a pair of opposed crushing rolls developing a forwardly open bite and a rear discharge for respectively picking the crops from the windrow and then after crushing discharging the crops into a windrow therebehind, means mounting said rolls on the framework for adjustment toward each other to close and open said bite, and operating means operatively associated with said last-mentioned means and operatively connected to said structure for actuation thereby to simultaneously lower the crusher unit attendant to lowering said structure and including means closing said bite by moving said rolls relatively toward each other and opening said bite and raising said crusher unit coincidental to raising of the platform.

5. The invention according to claim 4 and said operating means having a lost-motion connection with said structure whereby the latter may be raised and lowered a predetermined extent without actuating the former.

6. A crusher attachment for a windrower of the type having a mobile frame and a harvesting platform structure ahead of the frame and pivotal thereon about a generally horizontal transverse axis, means for lifting and lowering the harvester platform structure operatively connected thereto, said platform structure having a windrow discharge area, a crusher unit having a framework including mounting means, means on the mobile frame connected to said mounting means and providing therewith a transverse generally horizontal axis of pivot for the crusher about which it is raised and lowered, said crusher including a pair of opposed crushing rolls developing a forwardly open bite and a rear discharge for respectively picking the crops from the windrow and then after crushing discharging the crops into a windrow therebehind, means mounting said rolls on the framework for adjustment toward each other to close and open said bite, and operating means operatively associated with said last-mentioned means and operatively connected to said structure for actuation thereby to simultaneously lower the crusher unit attendant to lowering said structure and closing said bite by moving said rolls relatively toward each other and opening said bite and raising said crusher unit coincidental to raising of the platform, and the last mentioned means mounting said rolls on the framework comprising lever arms mounted on the framework for swinging movement on a generally horizontal transverse axis, means mounting one of said rolls on said lever means, a toggle linkage connected between said framework and said lever means, a spring loaded tension assembly operatively connected to said toggle means for actuating the latter, and lever means operatively connected on a fixed axis to said framework and having a lost-motion connection with the structure and pivotally connected to said tension assembly and movable in accordance with movement of said structure to actuate the toggle in the lowered position of the crusher unit and close the rolls and open the rolls by releasing the toggle while raising the crusher unit.

7. A crusher attachment for a windrower of the type described having an ambulatory frame and a harvesting platform structure thereahead and pivoted thereon on a generally horizontal transverse axis and having a discharge opening for depositing the crops in a windrow, the combination of a pair transversely spaced horizontally aligned brackets upon the frame having rear open ends, a crusher having a framework with an upper forward portion including outwardly extending members for extending into respective brackets through said open ends, said crusher vertically pivotal through said members about the brackets, said crusher including upper and lower vertically superposed rolls, said lower roll journalled to the framework on a fixed axis, said upper roll movably journalled on the framework and movable vertically toward and away from the lower roll, releasable framework-engaging means operatively interconnecting said framework with said frame for limiting downward movement of the crusher, means operatively associated with the framework and said upper roll for biasing the same toward the lower roll, and releasable means operatively connected to said last-mentioned means and to said framework and to said platform structure for conditioning said last-mentioned means and operative to bias said upper roll against the lower roll in a lowered operating position of the crusher and for conditioning said last-mentioned means to separate said upper roll from the lower roll and raising the crusher attendant to lifting of the platform to inoperative position.

8. A combination of a windrower having an ambulant frame and a harvester platform structure pivoted on the frame on a transverse generally horizontal axis for vertical swinging movement between a lowered operating position and an elevated transport position, and a crusher unit mounted on a transverse generally horizontal axis on the frame for vertical swinging movement between a lowered operating position and a raised transport position, link means operatively interconnecting said platform structure with said crusher unit and including a lost-motion connection accommodating limited free vertical movement of the platform structure in the lowered position thereof for adjustment to particular crop conditions, said means operative to raise said crusher attendant to elevation of the platform structure beyond the extent of said lost-motion.

9. A combination of a windrower having an ambulant frame and a harvester platform structure pivoted on the frame on a transverse generally horizontal axis for vertical swinging movement between a lowered operating position and an elevated transport position, and a crusher unit mounted on a transverse generally horizontal axis on the frame for vertical swinging movement between a lowered operating position and a raised transport position, link means operatively interconnecting said platform structure with said crusher unit and including a lost-motion connection accommodating limited free vertical movement of the platform structure in the lowered position thereof for adjustment to particular crop conditions, said means operative to raise said crusher attendant to elevation of the platform structure beyond the extent of said lost-motion, and said crusher comprising a pair of rolls relatively movable toward and away from each other to engaged and disengaged positions for respectively crushing the crops entered therebetween and disengaging the crops to pass excessive clogging bunches, and means operatively associated with said rolls and operatively interconnected with said link means for actuation thereby to condition said means to dispose the rolls in disengaged position upon elevation of the crusher and vice versa.

10. A crusher unit attachment, the combination of a frame having a pair of laterally spaced side portions and an intervening rear member interconnecting the same, a lower crushing roll between said portions fixedly mounted thereon for rotation on a transverse generally horizontal axis, an upper roll extending between said portions and having ends projecting through vertical slots in respective portions and thereby movable toward and away vertically with respect to the lower roll to engaged position therewith for crushing crops entered therebetween and to a separated position for disgorging excessive slugs of crops tending to plug the unit, a lever disposed at each side of the unit outwardly of respective side portions and each lever having a forward end pivoted on a generally horizontal transverse axis to the related side portion and having means intermediate its ends journalling the adjacent end of the upper roll, each lever having a rear end disposed proximate to the rear of the unit, a toggle at each side having upper and lower links arranged with one of their ends proximate, pivot means connecting said proximate ends of the links to each other, the upper and lower links having free ends pivoted respectively to the adjacent side portion and the rear end of the adjacent lever, a toggle loading structure pivoted to the links via said pivot means and extending diagonally upwardly and forwardly therefrom, a lever link associated with each toggle loading structure and having a lower end pivoted to the adjacent side portion and being pivoted intermediate its ends to the adjacent end of the respective toggle loading structure and having an upper end for connection to an associated operator for swinging the same to positions loading and unloading said toggle loading structure.

11. The invention according to claim 10 and mounting means connected to said side portions and disposed adjacent to the upper forward parts thereof, and mounting means connected to said rear member.

12. In a hay conditioner, a combination of a support including horizontally spaced apart portions, a first horizontal roll journalled at opposite ends on said portions, a second roll closely paralleling the first roll and having opposite ends respectively adjacent said portions, a pair of carriers respectively adjacent the portions, each carrier having a forward end pivoted to the respective portion, an intermediate part journalling the adjacent end of the second roll and a terminal rear end, a toggle linkage pivoted on each portion and operatively connected to the terminal end of the adjacent carrier, and loading means adjacent each carrier and toggle linkage and comprising a spring loaded member having a pivotal connection at one end to the respective toggle linkage, a lever member along each portion having one end pivoted to the adjacent portion and pivoted intermediate its ends to the other of said ends of the related spring load member, the points of pivot of the lever to the member, the portion of the toggle being substantially in alignment in the closed position of the rolls whereby substantial separations of the rolls does not substantially change the loading.

References Cited in the file of this patent
UNITED STATES PATENTS

| | | |
|---|---|---|
| 1,958,910 | Christiansen | May 15, 1934 |
| 1,968,683 | Hanson | July 31, 1934 |
| 2,592,269 | Getz | Apr. 8, 1952 |
| 2,592,928 | Martin | Apr. 15, 1952 |
| 2,630,664 | Hansen | Mar. 10, 1953 |
| 2,790,290 | Tufford | Apr. 30, 1957 |
| 2,811,819 | Heth | Nov. 5, 1957 |